United States Patent
Hay

(10) Patent No.: US 7,627,158 B2
(45) Date of Patent: Dec. 1, 2009

(54) AUTOMATIC REGISTRATION OF INTRA-MODALITY MEDICAL VOLUME IMAGES USING AFFINE TRANSFORMATION

(75) Inventor: Ori Hay, Haifa (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 539 days.

(21) Appl. No.: 10/566,136

(22) PCT Filed: Jul. 16, 2004

(86) PCT No.: PCT/IB2004/002399

§ 371 (c)(1),
(2), (4) Date: Jan. 27, 2006

(87) PCT Pub. No.: WO2005/010793

PCT Pub. Date: Feb. 3, 2005

(65) Prior Publication Data

US 2006/0204064 A1     Sep. 14, 2006

Related U.S. Application Data

(60) Provisional application No. 60/491,045, filed on Jul. 30, 2003.

(51) Int. Cl.
  *G06K 9/00* (2006.01)
  *G06K 9/32* (2006.01)
(52) U.S. Cl. .................. 382/131; 382/199; 382/294
(58) Field of Classification Search ............... 382/130, 382/131, 132, 199, 276, 277, 293, 294–296, 382/298
See application file for complete search history.

(56) References Cited

U.S. PATENT DOCUMENTS

| | | | | |
|---|---|---|---|---|
| 5,800,353 | A | 9/1998 | McLaurin | 600/407 |
| 7,106,891 | B2 * | 9/2006 | Wyman et al. | 382/128 |
| 7,206,462 | B1 * | 4/2007 | Betke et al. | 382/280 |
| 7,274,810 | B2 * | 9/2007 | Reeves et al. | 382/128 |
| 2002/0049378 | A1 | 4/2002 | Grzeszczuk et al. | 600/427 |
| 2002/0097901 | A1 | 7/2002 | Xu et al. | 382/131 |

FOREIGN PATENT DOCUMENTS

EP     1 081 647 A1    3/2001
WO    WO 02/23477 A2   3/2002

OTHER PUBLICATIONS

Betke, M., et al.; Automatic 3D Registration of Lung Surfaces in Computed Tomography Scans; 2001; Lecture Notes in Computer Science; vol. 2208; pp. 725-733.

(Continued)

*Primary Examiner*—Jon Chang

(57) ABSTRACT

A current diagnostic image and an archived diagnostic image of a common region of patient are loaded into a first memory (14) and a second memory (18). The diagnostic images are converted into feature images (24), scaled (40), and normalized (42). An affine transform determining processor (50) generates an affine transform representative of the error between the current and archived images. A transform operator (90) operates on one of the diagnostic images in accordance with the affine transform to bring the two images into registration. A display processor (104) displays corresponding pairs of slices of the registered first and second images on a monitor (22). A stepping processor (102) causes the displayed slice pairs of the registered images to be stepped together in coordination.

22 Claims, 4 Drawing Sheets

OTHER PUBLICATIONS

Rusinkiewicz, S., et al.; Efficient Variants of the ICP Algorithm; 2001; Proc. 3D Digital Imaging And Modeling; pp. 145-152.

MRIcro Tutorial Online; 2000; www.phychology.nottingham.ac.uk Section: "Yoking Images to Check Registration".

Maintz, J.B.A., et al.; A survey of medical image registration; 1998; Medical Image Analysis; 2(1)pp. 1-36.

Besl, P.J., et al.; A Method for Registration of 3-D Shapes; 1992; IEEE Trans. On Pattern Analysis and Machine Intelligence; 14(2)pp. 239-256.

Camera, O., et al.; Elastic Thoacic Registration with Anatomical Multi-Resolution; 2002; WSPC-Instruction File; pp. 1-19.

Fan, L., et al.; 3D Warping and Registration from Lung Images; 1999; SPIE Cof. Develop. in X-Ray Topography-Denver.

Fitzgibbon, A.W.; Robust Registration of 2D and 3D Point Sets; 2001; The British Machine Vision Conference.

Hong, H., et al.; Multilevel 3D Registration of Lung Surfaces in Computed Tomography Scans-Preliminary Experience; 2002; Int. Conf. On Diagnostic Imaging and Analysis; pp. 90-95.

Simon, D.A.; Fast and Accurate Shape-Based Registration; Dissertation; Carnegie Mellon University; 1996.

Matsuda, T., et al.; Registration and Integration of Multiple Range Images for 3-D Model Construction; 1996; IEEE; pp. 879-883.

* cited by examiner

AUTOMATIC REGISTRATION OF INTRA-MODALITY MEDICAL VOLUME IMAGES USING AFFINE TRANSFORMATION

CROSS REFERENCE TO RELATED APPLICATIONS

This application claims the benefit of U.S. provisional application Ser. No. 60/491,045 filed Jul. 30, 2003, which is incorporated herein by reference.

The present invention relates to the diagnostic imaging arts. It finds particular application in conjunction with CT oncological studies of the lungs and will be described with particular reference thereto. However, it is to be appreciated that the present invention is applicable to a wide range of diagnostic imaging modalities and to the study of a variety of organs for a variety of reasons.

When a patient is undergoing treatment for lung cancer, the lungs are periodically re-inspected, such as with a CT scanner. The oncologist compares the current images from the CT scanner with the images of the subject that were taken at an earlier time. Based on this comparison, the oncologist can determine the rate of progression of the disease or whether it is in remission.

Typically, the oncologist calls up both the current image data set and the prior image data set. The oncologist displays a transverse slice through the lungs of one of the image sets at the top of the video monitor and a transverse slice of the patient's lungs from the other data set at the bottom of the monitor. The oncologist manually steps through the two data sets independently and manually determines corresponding slices. Often, several thinner slices are fused into a thicker slice.

One of the difficulties resides in the matching of corresponding slices. The matching is both time consuming and subjective.

Moreover, the data from the two data sets may have been generated with different imaging parameters, with a different placement of the patient relative to the center of the scan circle, and the like. The two data sets may have slices of different thickness or skewed at different angles. The images may be shifted relative to the center of the scan circle. There may be differences in the field of view or scale of the images. The lungs may have been imaged at a different pulmonary phase. These and other such factors all contribute to the difficulty of manual image alignment and increase the prospect for subjectivity or human error.

Previously, technique have been developed that use fiducials to align two images. That is, fiducials or imageable markers are affixed to the patient closely adjacent the region of interest so that they are in a fixed relationship. These markers are readily aligned in the two images.

However, when the images are taken some duration apart, maybe months, maintaining the fiducials attached to the patient's exterior for that duration is inconvenient. Moreover, fiducials are used less commonly for internal organs in the torso because the patient surface moves in relation to most internal organs with respiration, body position, and the like.

Images have also been aligned using anatomical markers. That is, characteristic portions of the body around the region of interest, such as unique locations on the skull or the vertebrae, have been used instead of externally applied fiducials. However, distinct anatomical markers are not readily available for lungs and other organs which can move relative to them. Consequently, most fiducial and anatomical marker alignment techniques have been used in rigid portions of the body, such as the head inside the rigid skull or along the vertebrae.

The present application contemplates a new and improved automated registration technique which overcomes the above-referenced problems and others.

In accordance with one aspect of the present invention an apparatus for diagnostic imaging is disclosed. A first memory stores a first diagnostic image. A second memory stores a second diagnostic image. A means automatically registers the first and second diagnostic images from the first and second image memories without operator assistance. A means for concurrently displays corresponding slices of the first and second registered diagnostic images. A means concurrently steps the displayed slice to corresponding regions of the first and second images.

In accordance with another aspect of the present invention a method of diagnostic imaging is disclosed. A first and a second diagnostic images are stored. The first and second diagnostic images are automatically registered without operator assistance. Corresponding slices of the first and second registered diagnostic images are concurrently displayed. The displayed slices are concurrently stepped to corresponding regions of the first and second images.

One advantage of the present invention is that is quick, easy to use, and simple.

Another advantage of the present invention is that it is completely automatic.

Another advantage resides in its precision.

Another advantage resides in the coordinated viewing and stepping through the images of both scans in a single action.

Yet other advantages reside in the ease of follow-up examinations of the same patient.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not be construed as limiting the invention.

Figure 1:
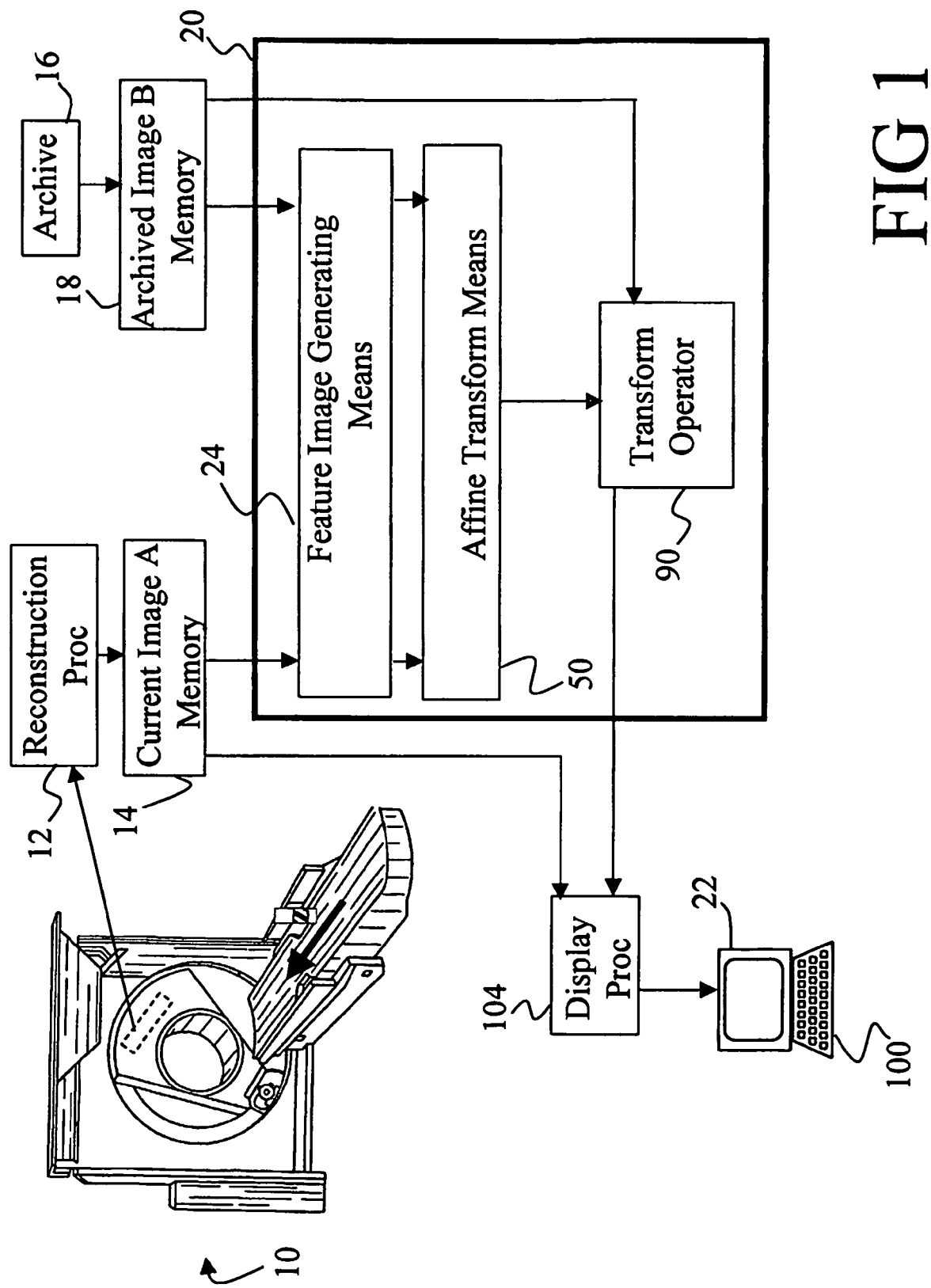
FIG. 1 is a diagrammatic illustration of an apparatus which automatically registers 3D images of a whole body part.

With reference to FIG. 1, a patient is positioned in a diagnostic imager 10, such as a CT scanner, for a follow-up examination. The generated data is reconstructed by a reconstruction processor 12 and stored in a 3D, volumetric image memory 14. Various image enhancement operations as are known in the art are also performed.

Image data from the hospital archive or from another storage medium 16 of the same region of the same patient is retrieved and stored in an archived 3D volumetric image memory 18. Of course, both the current and archive 3D image memories may be parts of a common storage medium. A registering means 20 retrieves the current and archived images and automatically register the two images for a concurrent display on a monitor 22.

Figure 2:
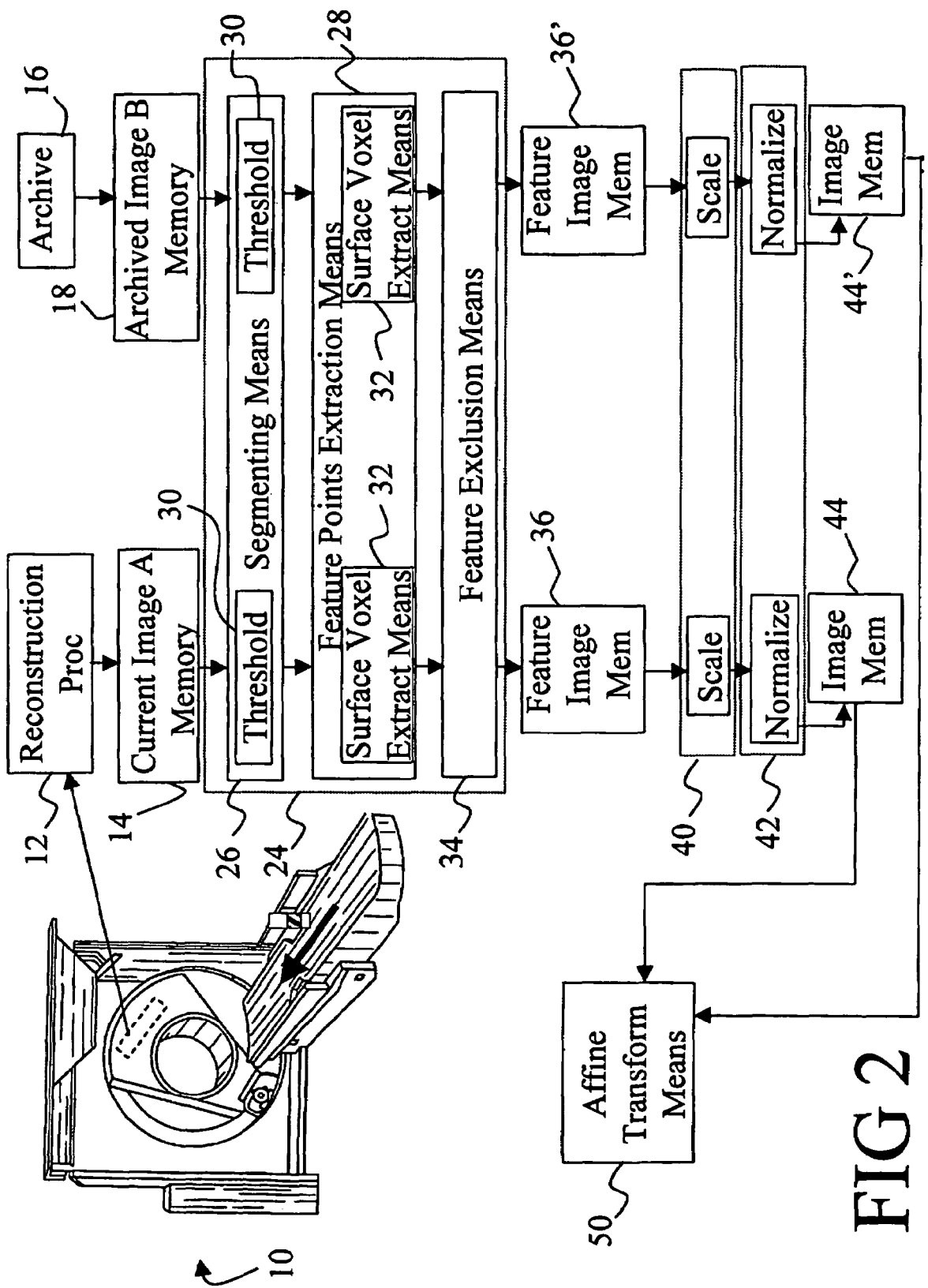
FIG. 2 is an expanded diagrammatic illustration of a part an apparatus of FIG. 1 which automatically registers 3D images of a whole body part.

With continuing reference to FIG. 1 and further reference to FIG. 2, a surface image generating means 24 generates surface images from the current archived images. A segmenting means 26 extracts the important body parts for the registration, then a feature extraction means 28 extracts common features for registration. Looking specifically to lung images, the segmentation includes a thresholding means 30 thresholds the images. More specifically to the lung embodiment, the thresholding means 30 sets the gray scale value of air in the lungs to one extreme value, e.g., black or white, and all tissue in the image to the other. Specifically to lung images, the feature extraction means 28 includes a surface voxel extracting means 32 which extracts the single layer of voxels which lies along the interface between the black and white regions. Preferably, the voxels which represent the tissue surface rather than the air surface are selected. A feature exclusion means 34 removes part of the features of the 3D image that is defective or artifacted, if any. Looking specifically to lung images, portions of the lung closely adjacent to the heart often suffer motion artifacts. To simplify the remaining operations, the feature exclusion means 32 optionally removes a common artifacted region from both image representations. The voxels are stored in feature or surface image memories or memory sections 36, 36'.

A scaling means 40 scales the two surface images in accordance with known differences in scanning parameters. For example, the images are adjusted for differences in the slice thickness of the scans, for the field of view, for magnification differences, and the like. A normalizing means 42 normalizes the two surface images. More specifically to the preferred embodiment, the extreme points along the z-axis of each image are labeled −1 in one direction and +1 in the other direction. Points in between are labeled proportionately. The same scaling is carried out with respect to the x and y-axes. Different normalization methods are also available, for example, computing the mean or median and standard deviation of the data and setting the central point to the mean or median and the length of one is set to the standard deviation from the mean or median. Of course, other coordinate systems are contemplated. The two scaled and normalized three-dimensional surface images are stored in scaled and normalized volume image memories or memory sections 44, 44'.

Figure 3:
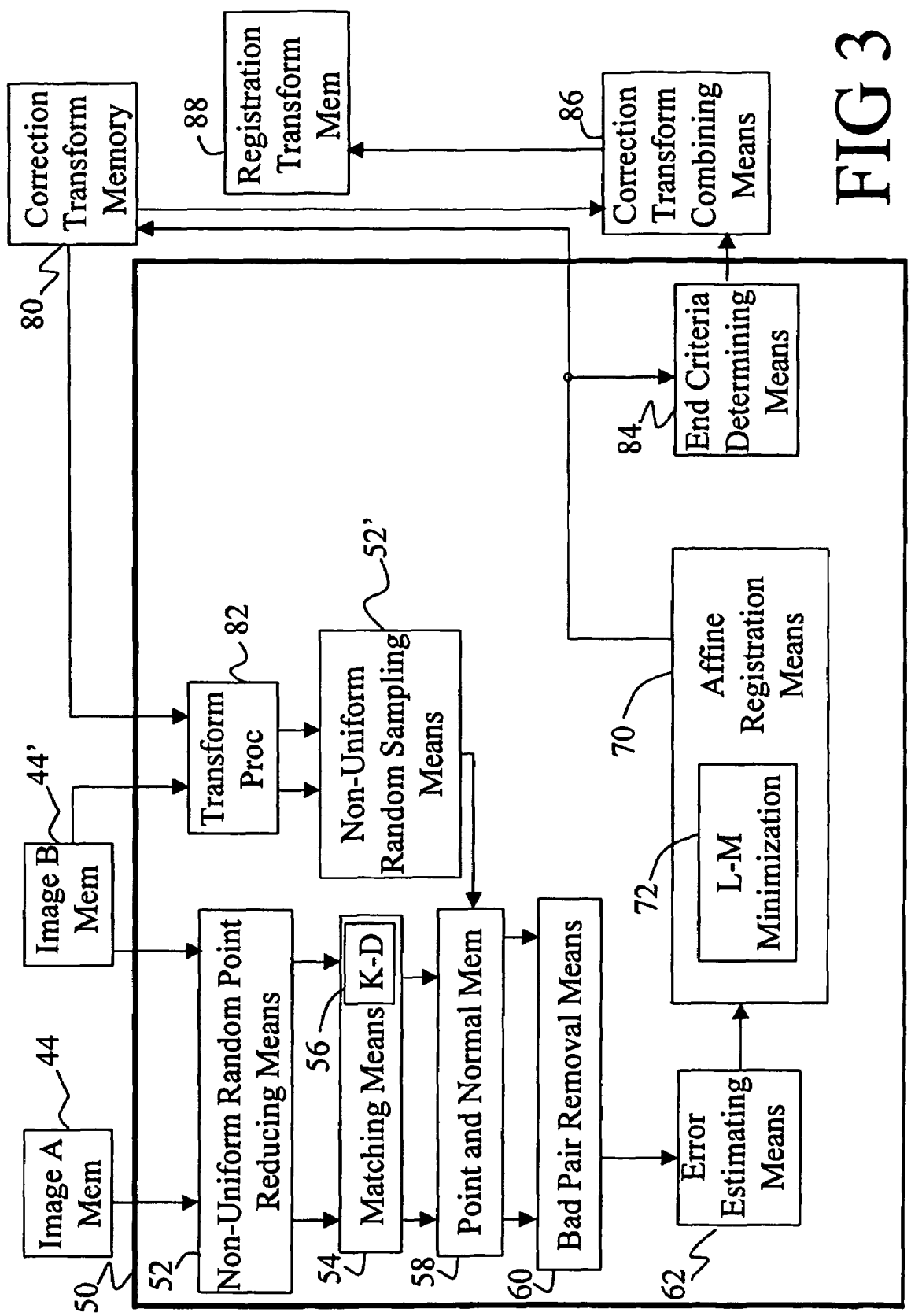
FIG. 3 is a diagrammatic illustration of the affine transform means of FIG. 1 and associated parts of the apparatus.

With continuing reference to FIGS. 1 and 2 and further reference to FIG. 3, an affine transform means 50 determines the twelve values of the affine transform that defines the registration error between the current and archived scaled and normalized 3D images. Specifically, the affine transform means 50 determines nine rotational components about three orthogonal axes and three translational components along the three axes. Optionally, a scaling parameter can also be determined.

The affine transform means 50 includes a selective or non-uniform random feature or point reducing means 52. That is, with normal CT resolution, the two surface images are still hundreds of thousands of voxels. To reduce the computational load, the selective (based on prior knowledge) point reducing means 52 or a non-uniform random point reducing means 52 preferably selectively (based on prior knowledge) randomly selects a fraction of the points, e.g., 1%, from both images. Because the diagnosing oncologist typically is most concerned with registration along the z- or longitudinal axis, the non-uniformity with which the points are selected is altered to favor points, which influence the z-registration. In the preferred embodiment, a higher percentage of points are selected along the top and bottom axes of the lungs. A matching means 54 matches the non-uniform randomly selected points from the one surface image with a corresponding point in the other surface image. In the preferred embodiment, a K-D tree matching technique or processor 56 is utilized. In each iteration, a non-uniformly random sample of the points from the current image, to be matched to the corresponding point in the other surface image, is taken to be matched to the other set of points from the previous image. For each point in the sample, a matching point is found using the K-D tree. For each matching pair, the coordinates or location of each voxel of the pair and the surface normal are determined. In the matching operation, if more than one candidate point has an equally good spatial match to the reference point, the point or voxel with the closest normal is selected to generate a set of points and normals which are stored in a point and normal memory means 58.

A bad pair removal means 60 removes matched pairs of points that fail to meet preselected criteria. In the preferred embodiment, these criteria include a physical separation distance greater than a preselected minimum, badly misaligned normals, and points near to the cut surface, if any. An error estimating means 62 estimates the error between the points. The error estimating means 62 calculates a weighted distance using the differences in x, y, z, and the normals. Each coordinate is assigned with different weight so that the differences in specific parts will be favored over other parts. Looking specifically to lung images, the differences in the z-coordinate have higher weight than the x and y-coordinates, and higher than the normal differences.

With continuing reference to FIG. 3, an error minimizing or affine registration means 70 finds an affine transform that minimizes the error between the pairs of points. In the preferred embodiment, the error minimizing means 70 uses a Levenberg-Marquardt minimization technique or processor 72. Using the weighted error estimate and the divergence of the weighted error estimate, the error minimizing means finds 70 a set of affine transformation parameters that gives the minimum of error for the set of sample pairs. Twelve affine transform coordinates and optionally the scaling correction are loaded into a correction transform memory 80.

With continuing reference to FIG. 3, a transform processor 82 transforms one of the current and archived scaled and normalized surface images from memories 44, 44' in accordance with the determined correction transform. The affine transform means 50 repeats the registration technique re-registering the volume images, with one of them subject to the transform, which was predicted, to transform them into registration. This process generates the twelve affine transform coordinates (and optionally scaling) of a correction transform to the first correction transform. An end criteria determining means 84 determines whether the two images have been aligned within acceptable tolerances by monitoring the correction transforms. In the preferred embodiment, the end criteria determining means 84 determines whether the global translation is less than a preselected threshold, whether the change in the correction transform is below a preselected threshold, or whether a preselected number of iterations have been performed. If any of these criteria are met, a correction transform combining means 86 combines the first correction transform and each of the subsequent correction transforms to provide a single registration transform which is stored in a registration transform memory or buffer 88.

Figure 4:
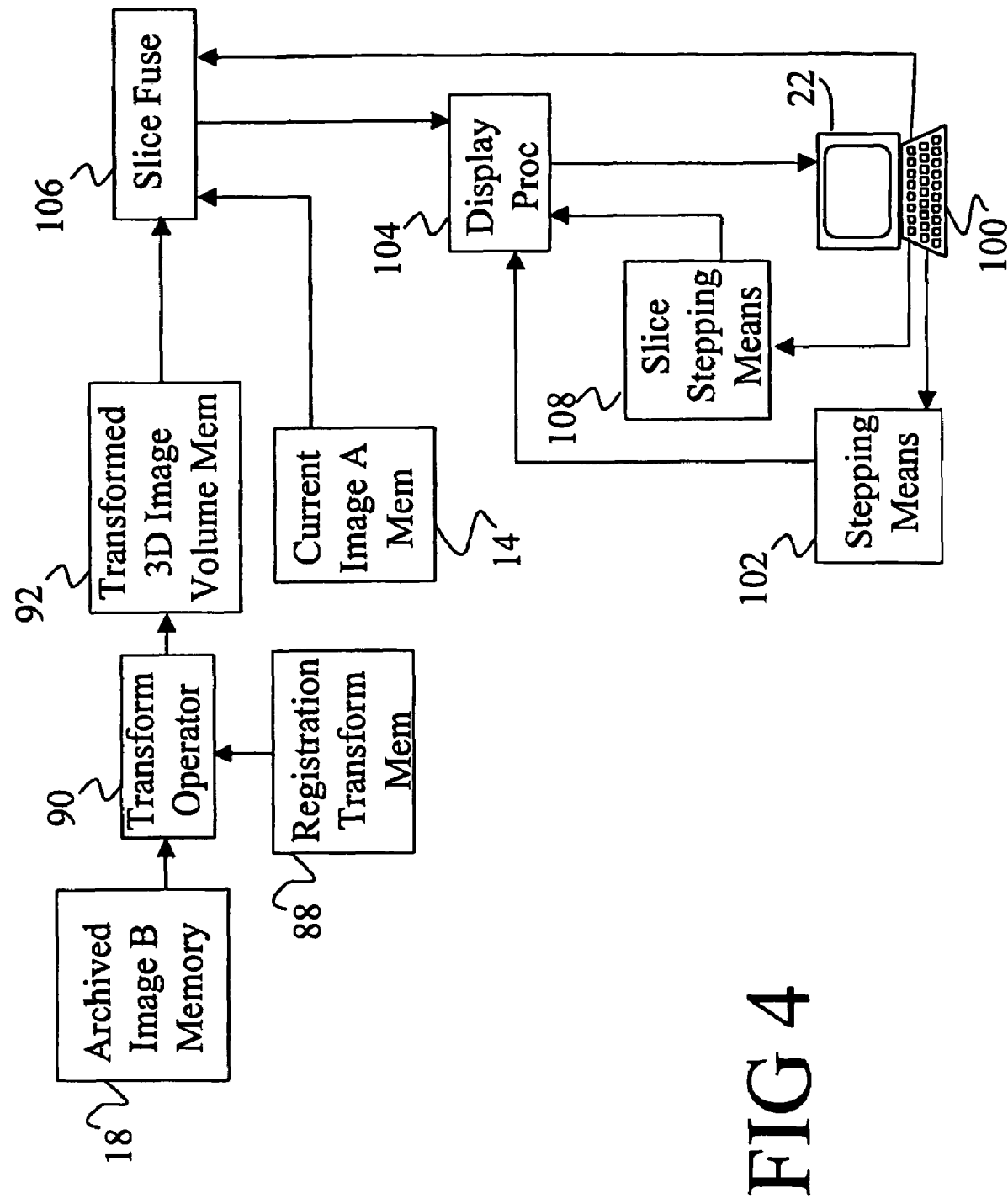
FIG. 4 is an expanded diagrammatic illustration of a part the apparatus of FIG. 1 which automatically registers 3D images of a whole body part and displays them on the monitor.

With reference to FIG. 1 again and further reference to FIG. 4, a transform operator 90 operates on one of the current and 3D archive images, preferably the archived image to register it with the current 3D volume image. The transformed archived image is stored in a transformed 3D image volume memory 92.

An operator, through a keyboard or other input device 100 controls a stepping means 102 which causes a display processor 104 to withdraw and display corresponding slices from the current 3D image memory 14 and the transformed 3D image memory 92 on a monitor 22. In the preferred embodiment, the transverse slice from the current image memory 14 is displayed on the top half of the screen and the corresponding slice of the transformed memory 92 is displayed on the bottom half of the screen. Preferably, corresponding orthogonal views are displayed adjacent the larger longitudinal slice. The operator input device 100 also controls a slice fusing means 106 that works with the display processor 104 to sum a preselected number of adjacent slices in each of the two images. The operator input means 100 is also connected with a single image slice stepping means 108, which can control the display processor 104 to step through slices of only one of the two 3D images independently of the other.

Typically, 3-5 slices are fused together for display on monitor 22. A global registration algorithm which registers the two three-dimensional volume images within ±2 slices is considered accurate registration due to the fusing of the number of adjacent images.

Although described with particular reference to CT scanner imaging, it is to be appreciated that this technique is also applicable to magnetic resonance images, PET images, SPECT images, and other three-dimensional diagnostic images. Moreover, the images being registered may be from mixed modalities. For example, a CT image can be registered using this technique with a PET image. When mixing modalities, care should be taken to assure that the features are defined in both imaging modalities or appropriate adjustment made. Further, although described with particular reference to the lungs, it is to be appreciated that this technique is also applicable to studies of other organs such as the colon, the liver, and other non-rigid organs. Moreover, this technique is also applicable to rigid portions of the body such as the head.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, invention is now claimed to be:

1. A method of diagnostic imaging comprising:
   storing a first diagnostic image;
   storing a second diagnostic image;
   automatically registering the first and second diagnostic images without operator assistance, the step of registering including:
      converting a portion of the first and second diagnostic images corresponding to a common non-rigid organ into corresponding feature image representations indicative of boundaries of the non-rigid organ in each of the first and second diagnostic images;
      determining an affine transform representative of a misalignment of the first and second feature image representations, determining the affine transform including:
         matching pairs of points in the first and second feature image representations, and
         removing matched pairs of points that fail to meet preselected criteria;
      operating on one of the first and second diagnostic images in accordance with the determined affine transform to register the common non-rigid organ in the first and second diagnostic images;
   concurrently displaying a corresponding pair of slices of the first and second registered diagnostic images; and
   concurrently stepping the displayed slice pair to display additional corresponding slice pairs of the first and second images.

2. A method of diagnostic imaging comprising:
   storing a first diagnostic image;
   storing a second diagnostic image;
   automatically registering the first and second diagnostic images without operator assistance, the registering step including:
      determining an affine transform representative of misalignment of the first and second diagnostic images, determining the affine transform including:
         reducing a number of points selectively, non-uniformly by one of prior knowledge and randomly,
         matching pairs of points in the first and second diagnostic images,
         determining differences between locations and surface normals of the matched points, and
         minimizing the deviation between the locations of the matched points,
      operating on one of the first and second diagnostic images in accordance with the determined affine transform to register the first and second images;
   concurrently displaying a corresponding pair of slices of the first and second registered diagnostic images; and
   concurrently stepping the displayed slice pair to corresponding regions of the first and second images.

3. The method as set forth in claim 2, wherein the step of matching includes:
   implementing a K D tree matching algorithm.

4. The method as set forth in claim 3, wherein the deviation minimizing step includes:
   utilizing a Levenberg Marquardt error minimization algorithm.

5. The method as set forth in claim 2, wherein the first diagnostic image is a current diagnostic image and the second diagnostic image is a previously generated diagnostic image stored in an archive, further including:
   generating the current diagnostic image of a volume of interest of a patient; and
   retrieving the previously generated image of the volume of interest of the patient.

6. The method as set forth in claim 2, wherein the step of reducing the number of points is such that only 1% of the points remain.

7. The method as set forth in claim 2, wherein the first and second diagnostic images are aligned along an axis along which the displayed slices are stepped and wherein in the step of reducing the number of points, more data points are retained along the stepping axis than points along other axes such that registration along the stepping axis is enhanced relative to the other axes.

8. The method as set forth in claim 2, wherein the step of reducing the number of points removes points adjacent a heart to eliminate motion artifacts caused by the beating heart.

9. The method as set forth in claim 2, wherein the step of reducing the number of points includes preferentially removing points which fall near a cut edge.

10. The method as set forth in claim 2, further including:
   prior to displaying the corresponding pair of slices of the first and second registered diagnostic images, combining a preselected plurality of slices of each of the first and second registered diagnostic images such that during the concurrent stepping step, an operator steps through thick slices of the first and second registered diagnostic images.

11. The method as set forth in claim 2, further including: oversampling points along a direction in which the displayed slice pair is stepped.

12. A method of diagnostic imaging a lung comprising:
storing a first diagnostic image;
storing a second diagnostic image;
automatically registering the first and second diagnostic images without operator assistance, the step of registering including:
  converting a portion of the first and second diagnostic images corresponding to a lung into corresponding feature image representations indicative of boundaries of the lung in each of the first and second diagnostic images including:
    segmenting the lung in the diagnostic images to assign tissue on one side of a boundary of the lung a first value and tissue or air on another side of the boundary of the lung a second value, distinct from the first value, and
    extracting a boundary layer of voxels of the lung;
  determining an affine transform representative of a misalignment of the first and second feature image representations; and
  operating one of the first and second diagnostic images in accordance with the determined affine transform to register the lung in the first and second diagnostic images;
concurrently displaying a corresponding pair of slices of the first and second registered diagnostic images; and
concurrently stepping the displayed slice pair to display additional corresponding slice pairs of the first and second images.

13. The method as set forth in claim 12, wherein the step of determining the affine transform further includes:
selecting a reduced fraction of points to be matched in the first and second feature image representations.

14. The method as set forth in claim 12, further including prior to determining the affine transform:
scaling the boundary layer; and
normalizing the boundary layer.

15. The method as set forth in claim 12, further including:
operating on the boundary layer with the determined affine transform; and
iteratively determining correction transforms to the affine transform to optimize the affine transform.

16. The method as set forth in claim 12, further including:
combining an operator selected plurality of slices in each of the displayed slice images.

17. The method as set forth in claim 12, further including:
determining a long axis of the segmented lung in the first and second diagnostic images;
aligning the long axes;
scaling first and second diagnostic images such that a length of the aligned axes is scaled to common units and the long axes have a common center.

18. The method as set forth in claim 12, further including removing points along the images of the lungs which are adjacent to a heart to reduce motion artifacts.

19. A diagnostic imaging apparatus comprising:
at least one memory which stores a first 3D diagnostic image and a second 3D diagnostic image, the first and second 3D diagnostic images including a common non-rigid organ of a patient;
a display on which a corresponding pair of slices of the first and second diagnostic images are displayed;
a user interface by which a user concurrently steps through a plurality of corresponding pairs of slices of the first and second diagnostic images; and
a registration processor which registers the common non-rigid organ in the first and second diagnostic images, the registration processor being programmed to perform the steps of:
  determining a border of the common non-rigid organ in the first and second diagnostic images;
  determining corresponding axes of the borders of the common non-rigid organ of the first and second diagnostic images;
  aligning the axes and scaling the axes to a common dimension;
  selecting a fraction of pairs of points on the borders of the common organ of the first and second images;
  matching the pairs of points to determine their relative closeness and a similarity of their normals;
  eliminating points that are displaced by more than a selected distance and whose normals fail to match within selected criteria;
  minimizing a deviation between the locations of the matched points;
  determining a transform which registers the borders of the common non-rigid organs in the first and second 3D diagnostic images by:
    applying the determined transform to one of the first and second 3D diagnostic images to align it with the other; and
  in response to commands from the user input device, displaying corresponding slices orthogonal to the common axis and stepping to other corresponding slices along the common axis.

20. The apparatus as set forth in claim 19, wherein the common non-rigid organ is the lungs of the patient.

21. The apparatus as set forth in claim 19, wherein the registration processor is further programmed to:
combine a corresponding plurality of the slices of the first and second 3D diagnostic images such that each displayed pair of corresponding slices represents the sum of a plurality of slices.

22. The apparatus as set forth in claim 19, wherein one of the 3D diagnostic images is a current image of the patient generated by a diagnostic imaging device and the other 3D diagnostic image is an image of the patient taken at an earlier time such that the displayed pairs of corresponding slices can be used to determine the progress of at least one of a disease and a treatment for the disease.

* * * * *